(12) United States Patent
Willson et al.

(10) Patent No.: US 7,319,387 B2
(45) Date of Patent: Jan. 15, 2008

(54) GPS INTERFACE FOR LOCATING DEVICE

(75) Inventors: Corey M. Willson, Dripping Springs, TX (US); Ziyad Hanna Doany, Austin, TX (US); Timothy A. Parkinson, Austin, TX (US)

(73) Assignee: 3M Innovaative Properties Company, St. Paul, MN (US)

( * ) Notice: Subject to any disclaimer, the term of this patent is extended or adjusted under 35 U.S.C. 154(b) by 304 days.

(21) Appl. No.: 10/802,345

(22) Filed: Mar. 17, 2004

(65) Prior Publication Data

US 2005/0206562 A1    Sep. 22, 2005

(51) Int. Cl.
*G08B 1/08* (2006.01)
(52) U.S. Cl. .............. 340/539.13; 340/539.1; 340/539.11; 340/539.2; 340/825.36; 340/825.49; 342/385; 342/459
(58) Field of Classification Search ........ 340/539.13, 340/539.1, 539.11, 539.2, 825.36, 825.49; 342/385, 459
See application file for complete search history.

(56) References Cited

U.S. PATENT DOCUMENTS

| | | | |
|---|---|---|---|
| 4,814,711 A | 3/1989 | Olsen et al. | |
| 5,065,098 A | 11/1991 | Salsman | |
| 5,214,757 A | 5/1993 | Mauney et al. | |
| 5,250,955 A * | 10/1993 | Major et al. | 342/457 |
| 5,264,795 A | 11/1993 | Rider | |
| 5,576,973 A | 11/1996 | Haddy | |
| 5,819,859 A | 10/1998 | Stump et al. | |
| 5,825,298 A | 10/1998 | Walter | |
| 5,949,373 A | 9/1999 | Eslambolchi | |
| 6,043,777 A * | 3/2000 | Bergman et al. | 342/357.09 |
| 6,259,990 B1 * | 7/2001 | Shojima et al. | 701/209 |
| 6,650,293 B1 | 11/2003 | Eslambolchi et al. | |
| 6,683,538 B1 * | 1/2004 | Wilkes, Jr. | 340/903 |
| 6,711,535 B2 | 3/2004 | Ford et al. | |
| 6,958,708 B2 * | 10/2005 | Burg et al. | 340/905 |
| 7,079,025 B2 * | 7/2006 | Michalson et al. | 340/539.13 |
| 7,142,096 B2 * | 11/2006 | Eisenman | 340/426.1 |
| 7,167,715 B2 * | 1/2007 | Stanforth | 455/457 |
| 2002/0171438 A1 | 11/2002 | Dudley | |
| 2003/0164789 A1 | 9/2003 | Taylor, Jr. et al. | |

FOREIGN PATENT DOCUMENTS

| | | |
|---|---|---|
| EP | 0 798 570 A2 | 10/1997 |
| EP | 0 849 611 A2 | 6/1998 |
| EP | 0 855 595 A2 | 7/1998 |
| JP | 20020998774 | 4/2002 |

* cited by examiner

*Primary Examiner*—Daryl C Pope
(74) *Attorney, Agent, or Firm*—John A. Burtis

(57) ABSTRACT

A system for locating a position marker includes a locating device for locating the position marker, and a GPS device communicatively coupled to the locating device that provides GPS coordinate data when the position marker is located by the locating device. Electronic memory is provided in at least one of the locating device and the GPS device for storing a data record associating the GPS coordinate data with the located position marker.

18 Claims, 4 Drawing Sheets

GPS INTERFACE FOR LOCATING DEVICE

BACKGROUND OF THE INVENTION

The present invention relates to a device for locating position markers, and more particularly to a GPS device having an interface for communication with a position marker locator to associate GPS position data with the marker.

Position marking products are commonly used to mark the location of field features such as underground utility cables. These markers have traditionally been implemented as passive antennas that are locatable by transmitting an RF signal from a locator that is reflected by the marker back to the locator. The user of the locator is then able to document the position of the marker by employing cartographic or surveying equipment to determine the GPS coordinates of the locator and marker, and transcribing or electronically logging the coordinates that are determined. This equipment may be professional use equipment utilizing differential GPS technology, or may be a retail GPS receiver, depending on the accuracy required. After a number of markers have been located and their GPS coordinates have been determined, the list of coordinates can be manually uploaded into a mapping application, typically implemented as a software program on a personal computer (PC).

More advanced position markers have been recently introduced that have the ability to store data associated with the marker, so that data can be written to the marker and retrieved from the marker by a locator device. The data that is written and retrieved can also be stored in the memory of the locator device, for later uploading to a PC. While these markers have added utility to the locating process, the process required to determine GPS coordinates of the markers has remained substantially the same.

An exemplary existing locating system includes Dynatel™ locating devices manufactured by 3M Company of St. Paul, Minn. under the 2200M Series product name (for products capable of locating position markers and cables) or under the 1400 Series product name (for a product capable of locating position markers), and includes EMS position markers manufactured by 3M Company of St. Paul, Minn. under various product names. As mentioned above, GPS coordinates may be determined for the located markers by a separate, stand-alone GPS system, many of which are commercially available from various manufacturers, and the determined GPS coordinates are transcribed or electronically logged in a process separate from the location process. U.S. Pat. No. 5,576,973 to Haddy describes a system in which GPS coordinate data that is determined for a located marker is recorded in the marker.

It would be useful to provide position marker locating capability that is more efficiently able to determine the GPS coordinates of the markers.

BRIEF SUMMARY OF THE INVENTION

A system for locating a position marker is disclosed herein. A locating device locates the position marker, and a GPS device is communicatively coupled to the locating device to provide GPS coordinate data when the position marker is located by the locating device. Electronic memory is provided in at least one of the locating device and the GPS device for storing a data record associating the GPS coordinate data with the located position marker.

DETAILED DESCRIPTION

Figure 1:
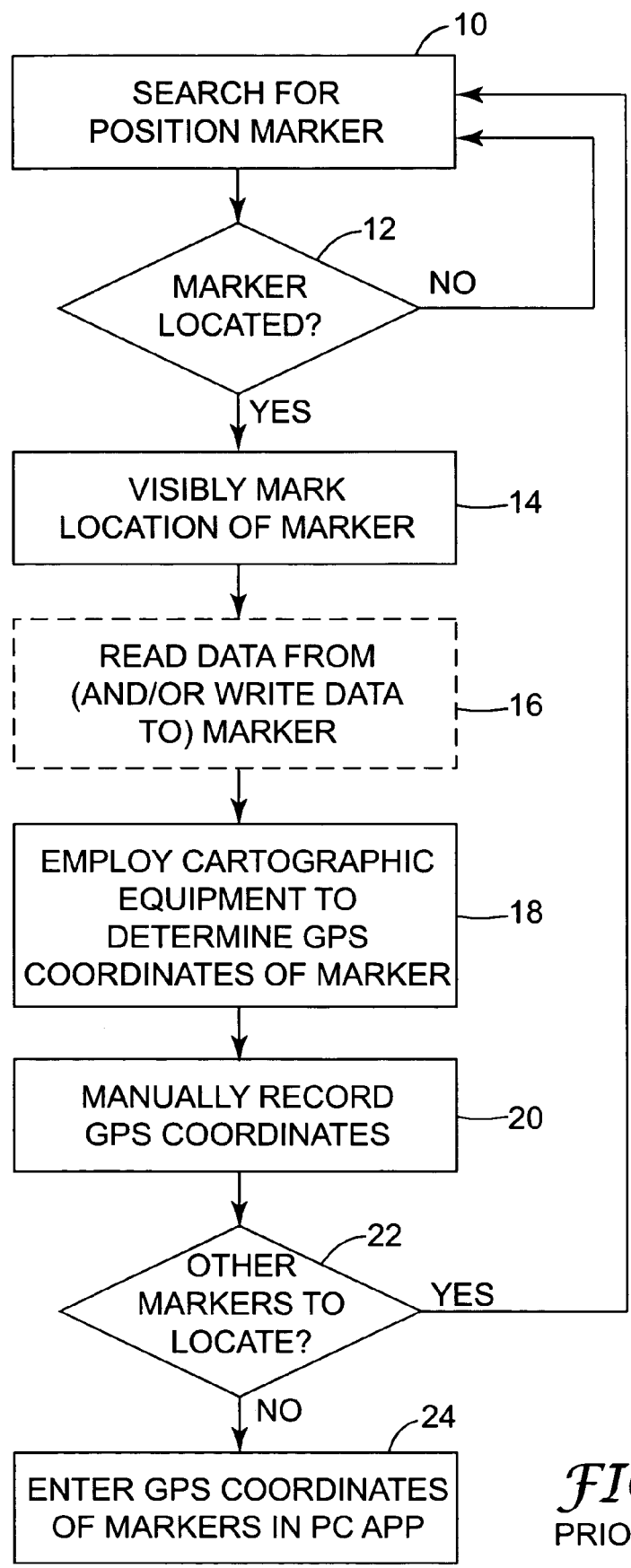
FIG. 1 is a flow diagram illustrating a conventional process of locating and mapping position markers.

FIG. 1 is a flow diagram illustrating a conventional process of locating and mapping position markers. In a first step 10, a field technician searches for a position marker with a conventional locating device. An example of a suitable locating device is a Dynatel™ Locator, manufactured by 3M Corporation of St. Paul, Minn. under the 2200M Series product name. The locating device provides a visual and/or audio signal to guide the field technician to the location of the position marker. The step of searching for the position marker continues until the marker is located, as indicated by decision step 12. Once the position marker has been located, its location is visibly marked by a physical marker as indicated by step 14. Alternatively, if GPS equipment is available at the same time that the position marker is located, the locating device is simply held at the indicated location. The position marker may be a traditional non-data-storing marker, in which case it is not possible to read data from and write data to the marker. However, in some situations the position marker may be an RFID type of marker that has the capability to store information, in which case data can be read from and written to the marker, as indicated by optional step 16. Once the position marker has been located and its position marked, cartographic equipment may be employed to determine the GPS coordinates of the position marker, as indicated by step 18. These coordinates are then recorded manually by the field technician (or electronically logged by the GPS equipment), as indicated by step 20.

Once a position marker has been located and its GPS coordinates have been determined and recorded, the process may be repeated for other position markers, as indicated by decision step 22. If there are no further position markers to locate for a particular project (or if time does not permit further locating activity, for example), the GPS coordinates that were determined for the located position markers are uploaded, such as by manual data entry, in a batch process to a computer mapping application, as indicated by step 24.

Figure 2:
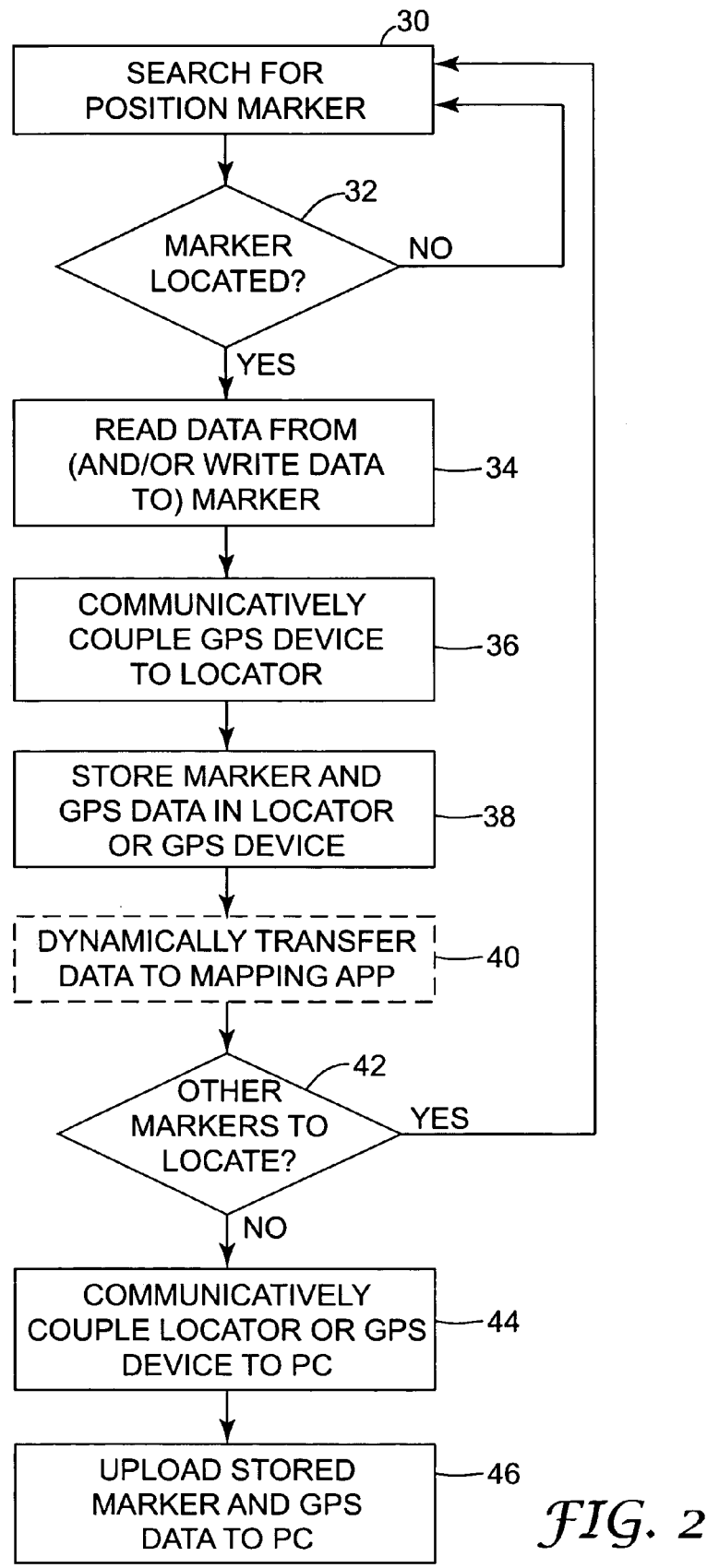
FIG. 2 is a flow diagram illustrating a process of locating and mapping position markers according to an embodiment of the present invention.

FIG. 2 is a flow diagram illustrating a process of locating and mapping position markers according to an embodiment of the present invention. In a first step 30, a field technician searches for a position marker using a locating device having capabilities similar to a conventional locating device described above. The step of searching for the position marker continues until the marker is located, as indicated by decision step 32. Once the position marker has been located, a number of actions may occur. In situations where the position marker has the capability to store information, data can be read from and written to the marker, as indicated by optional step 34. Also, once the position marker has been located, GPS coordinates can be associated with the marker. A GPS device may be communicatively coupled to the locating device, as indicated by step 36. Alternatively, GPS capability may be provided as an integral part of the locating device. The locating device is then operated to store marker data and GPS coordinate data, as indicated at step 38. This provides the ability to associate GPS coordinate data with position markers in a single field process with the press of a single button by the user, which has not been possible with existing systems. In some embodiments, the locating device is equipped with communication equipment that allows automatic uploading of the GPS coordinate data and marker data to a remote computer, as indicated at step 40. This may be achieved in a number of different ways, such as a wired serial or USB connection, a wireless infrared or RF connection, communication via a local or wide area network, or in other ways. In other embodiments, the locating device simply stores the GPS coordinate data and marker data in its memory as an appropriately formatted data record, or itself includes processing capability sufficient to run a mapping application program that may be automatically updated by the GPS coordinate data acquired.

Once a position marker has been located and its GPS coordinates and other marker data have been determined and uploaded or stored in memory of the locating device, the process may be repeated for other position markers, as indicated by decision step 42. If there are no further position markers to locate for a particular project (or if time does not permit further locating activity, for example), the locating device may be communicatively coupled to a computer as indicated by step 44, and the GPS and marker data that were stored for the located position markers are uploaded to a computer mapping application, as indicated by step 46.

Figure 3:
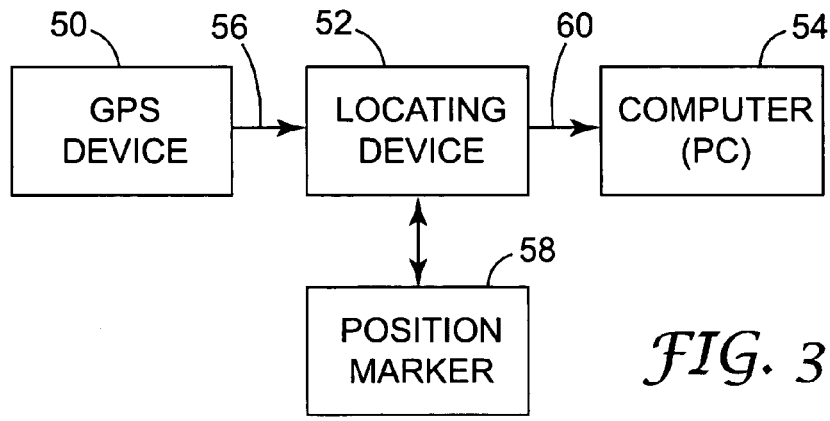
FIG. 3 is a diagram illustrating a first embodiment of a GPS position marker locating and mapping system.
Figure 4:
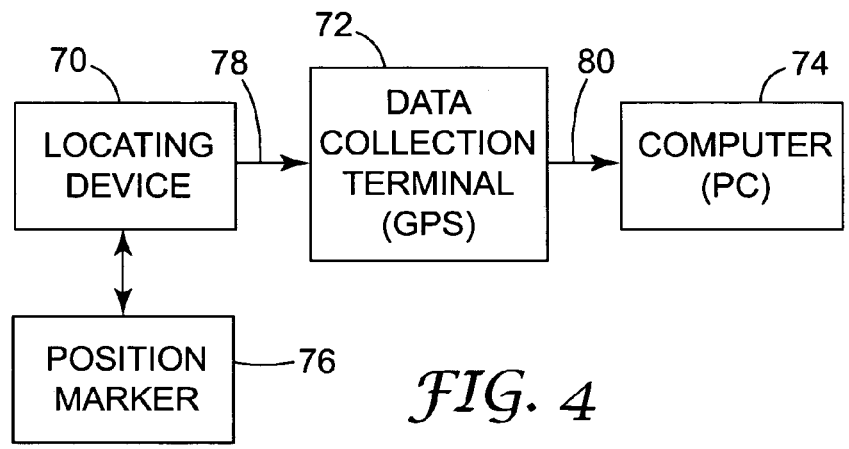
FIG. 4 is a diagram illustrating a second embodiment of a GPS position marker locating and mapping system.
Figure 5:
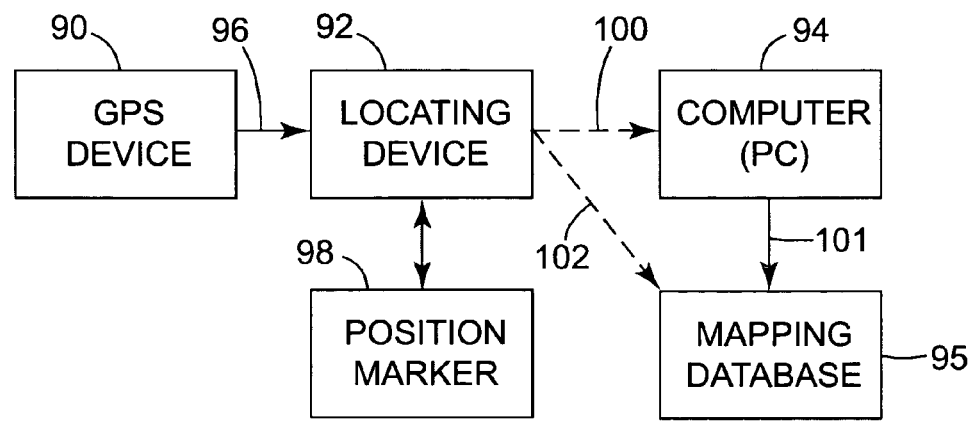
FIG. 5 is a diagram illustrating a third embodiment of a GPS position marker locating and mapping system.

The general process described in the flow diagram of FIG. 2 may be implemented by a number of different combinations of devices. FIGS. 3-5 illustrate various exemplary embodiments of a GPS position marker locating and mapping system.

FIG. 3 is a diagram illustrating a first embodiment of a GPS position marker locating and mapping system. This embodiment includes GPS device 50, locating device 52, and computer (PC) 54. GPS device 50 communicates with locating device 52 via communication link 56, which may be a wired or wireless link of any type, such as RS-232, USB, infrared, RF, or an internal bus or embedded connection, among others. Locating device 52 operates in a manner known in the art to locate position marker 58, and may also write data to and read data from marker 58 in embodiments where marker 58 has that capability. Thus, locating device 52 is operable to receive GPS coordinate data from GPS device 50 and to receive position marker data from marker 58. This data is stored in the memory of locating device 52. Locating device 52 is then able to communicate with PC 54 via communication link 60, which may be a wired or wireless link. The GPS coordinate data and marker data are uploaded from locating device 52 to an application running on PC 54, such as a mapping application. This configuration provides the ability to associate GPS coordinate data with position markers in a single field process, controllable by a single user button press or command, by operating GPS device 50 and locating device 52 together in the field.

In an exemplary configuration, GPS device 50 is a commercially available retail GPS receiver operating according to the standard NMEA (National Marine Electronics Association) protocol, such as an eTrex® GPS receiver manufactured by Garmin International Inc. of Olathe, Kans. In this configuration, GPS device 50 repeatedly outputs GPS coordinates according to its location. Locating device 52 is a Dynatel™ Locator manufactured by 3M Corporation of St. Paul, Minn. under the 2200M Series product name, and is connected to GPS device 50 by an RS-232 interface. Locating device 52 captures the GPS coordinate data output by GPS device 50 when commanded by the user, indicating that position marker 58 has been located. This command also initiates a read operation to read data from position marker 58, if it is an RFID marker equipped to store data. PC 54 runs mapping software such as the Microstation® line of products (e.g., GeoGraphics®) sold by Bentley Systems, Incorporated of Exton, Pa., the Autodesk Map™ series of products sold by Autodesk, Inc. of San Rafael, Calif., the ArcView® series of products sold by ESRI of Redlands, Calif., or another suitable software product. As described previously, position marker 58 is an EMS marker manufactured by 3M Company of St. Paul, Minn. under various product names. These examples are intended to illustrate the devices that can be used to make up the GPS position marker locating and mapping system, and are not intended for the purpose of limitation of any kind.

FIG. 4 is a diagram illustrating a second embodiment of a GPS position marker locating and mapping system. This embodiment includes locating device 70, GPS-enabled data collection terminal 72, and computer (PC) 74. Locating device 70 operates in a manner known in the art to locate position marker 76, and may also write data to and read data from marker 76 in embodiments where marker 76 has that capability. Locating device 70 communicates with data collection terminal 72 via communication link 78, which may be a wired or wireless link of any type, such as RS-232, USB, infrared, RF, or an internal bus or embedded connection, among others. Data collection device 72, which is a hand-held computer of the type often used for data collection in field applications, determines GPS coordinates and associates that GPS coordinate data with position marker 76, including marker data if that data exists. Examples of suitable data collection devices are the Mobile Mapper™ product sold by Thales Navigation, Inc. of Santa Clara, Calif. or the GeoExplorer® series of products sold by Trimble Navigation Limited of Sunnyvale, Calif. Thus, data collection device 72 generates GPS coordinate data and receives position marker data from locating device 70. This data is stored in the memory of data collection device 72. Data collection device 72 has the capability to manipulate marker data and GPS coordinate data in a format used by an appropriate mapping software program, such as the programs mentioned above with respect to FIG. 3. Data collection device 72 is then able to communicate with PC 74 via communication link 80, which may be a wired or wireless link. The GPS coordinate data and marker data is uploaded from data collection terminal 72 to the mapping application running on PC 74. This configuration provides the ability to associate GPS coordinate data with position markers in a single field process, controllable by a single user button press or command, by operating locating device 70 and data collection terminal 72 together in the field.

In an exemplary configuration, locating device 70 is a Dynatel™ Locator manufactured by 3M Corporation of St. Paul, Minn. under the 2200M Series product name, and is connected to data collection device 72 by an RS-232 interface. As described previously, position marker 76 is an EMS marker manufactured by 3M Company of St. Paul, Minn. under various product names.

FIG. 5 is a diagram illustrating a third embodiment of a GPS position marker locating and mapping system. This embodiment includes GPS device 90, locating device 92, computer (PC) 94 and mapping database system 95. Similar to the first embodiment described above and shown in FIG. 3, GPS device 90 communicates with locating device 92 via communication link 96, which may be a wired or wireless link of any type, such as RS-232, USB, infrared, RF, or an internal bus or embedded connection, among others. Locating device 92 operates in a manner known in the art to locate position marker 98, and may also write data to and read data from marker 98 in embodiments where marker 98 has that capability. Thus, locating device 92 receives GPS coordinate data from GPS device 90 and receives position marker data from marker 98. This data is then transferred to mapping database system 95, either by upload on communication link 100 to PC 94 which then communicates the data to mapping database system 95 on communication link 101, or by direct communication from locating device 92 to mapping database system 95 on communication link 102. These communication links may be wired or wireless links of any suitable type, such as RS-232, USB, infrared, RF, or communication on a wired or wireless local or wide area network, among others. Also, the functions of PC 94 may be integrated into GPS device 90, where GPS device 90 includes sufficient processing capability to run mapping software directly. The configuration shown in FIG. 5 provides the ability to associate GPS coordinate data with position markers and to dynamically update a mapping database in a single field process, controllable by a single user button press or command, by operating locating device 90 and data collection terminal 92 together in the field and dynamically transferring the GPS coordinate data and marker data to mapping database system 95.

In an alternative version of the embodiments shown in FIGS. 3-5, the functions of the GPS device may be integrated into the locating device.

Figure 6:
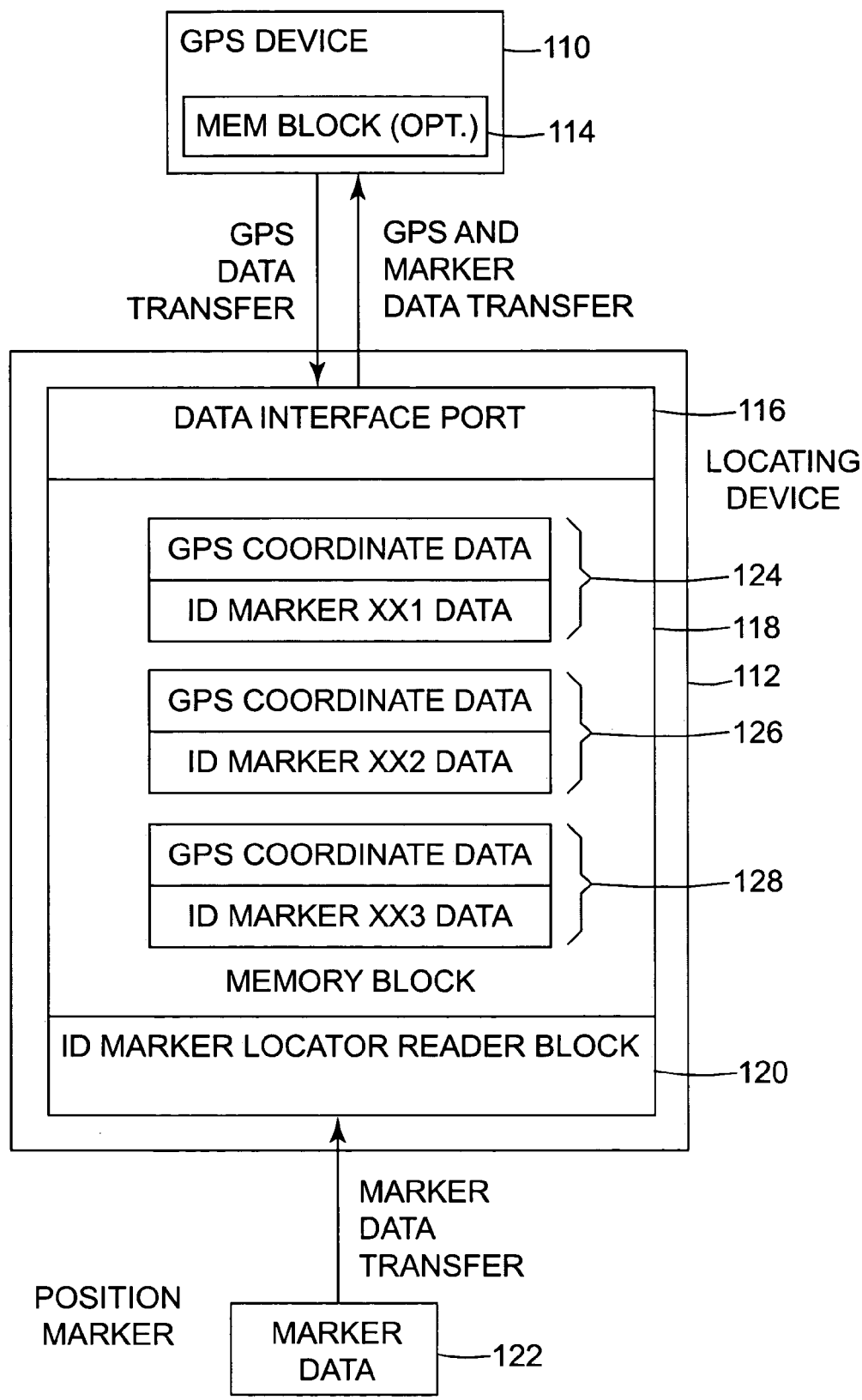
FIG. 6 is a diagram illustrating exemplary data communication and storage achieved by a GPS position marker locating and mapping system.

FIG. 6 is a diagram illustrating exemplary data communication and storage achieved by a GPS device 110 and locating device 112 in a GPS position marker locating and mapping system. GPS device 110 includes an optional memory block 114. Locating device 112 includes data interface port 116, memory block 118, and position marker locator reader block 120. An exemplary position marker 122 stores marker data in its memory.

In operation, locating device 112 operates in a manner known in the art to locate the position of marker 122. Once marker 122 has been located, locating device 112 receives the marker data stored in marker 122 at position marker reader block 120. Locating device 112 also receives GPS coordinate data from GPS device 110 at data interface port 116. Receiving both marker data and GPS coordinate data allows locating device 112 to store records in memory block 114 that associate GPS coordinate data with position marker data. The example illustrated in FIG. 6 shows data records 124, 126 and 128, each of which have GPS coordinate data associated with indexed position marker data. This association and storage of data is accomplished in a single field process, which has not been possible with existing systems.

In an alternative embodiment, memory block 114 of GPS device 110 stores the GPS data and marker data, rather than (or in addition to) memory block 120 of locating device 112. In this embodiment, data is communicated from data interface port 116 of locating device 112 to GPS device 110, so that the data records can be stored in memory block 114 of GPS device 110.

The disclosed GPS position marker locating and mapping system provides the ability to associate GPS data with position markers in a single field process. In some embodiments, the locating device or a computer coupled to the locating device is equipped with communication equipment that allows automatic uploading of the GPS and marker data to a remote mapping database system. In other embodiments, the locating device simply stores the GPS and marker data in its memory as an appropriately formatted data record, for later upload to a mapping system. The system reduces the amount of time and expense involved to determine GPS coordinates for located position markers.

Many of the features described above have several possible implementations. For example, GPS coordinate data and marker data may be stored in a variety of media, such as a removable memory card (secure digital memory card, compact flash card, PCMCIA card, microdrive), an external hard disc drive, a CD, a DVD, or another type of media. The data records may be stored in many different formats, which may be dictated by the mapping software that is employed. The data records may also be arranged in a variety of different ways, such as the memory block format shown in FIG. 6, or in memory link tables, vector tables, or other arrangements. The examples described herein are not intended to limit the scope of the invention in any way.

Although the present invention has been described with reference to preferred embodiments, workers skilled in the art will recognize that changes may be made in form and detail without departing from the spirit and scope of the invention.

The invention claimed is:

1. A system for locating a position marker, comprising:
   a locating device for obtaining the physical location of the position marker but not GPS coordinates associated with the physical location;
   a GPS device communicatively coupled to the locating device, the GPS device providing GPS coordinate data associated with the obtained physical location of the position marker when the position marker is located by the locating device; and
   electronic memory in at least one of the locating device and the GPS device for storing a data record associating the GPS coordinate data with the located position marker.

2. The system of claim 1, further comprising:
   a computer for running a mapping application, the computer being capable of receiving the data record stored in the electronic memory to update the mapping application.

3. The system of claim 2, wherein the electronic memory is located in the locating device and the locating device is capable of transmitting the data record to the computer.

4. The system of claim 2, wherein the electronic memory is located in the GPS device and the GPS device is capable of transmitting the stored data record to the computer.

5. The system of claim 1, wherein the locating device reads marker data from the position marker.

6. The system of claim 5, wherein the data record includes GPS coordinate data provided by the GPS device that is associated with marker data read from the position marker.

7. The system of claim 1, wherein the electronic memory is a removable memory card.

8. The system of claim 1, wherein the GPS device is connected to the locating device by an RS-232 cable.

9. A locating device for locating a position marker, comprising:
   a locating system for obtaining the physical location of the position marker but not GPS coordinates associated with the physical location and reading marker data from the position marker;

a GPS system for providing GPS coordinate data associated with the obtained physical location of the position marker when the position marker is located by the locating circuitry; and electronic memory for storing a data record associating the GPS coordinate data with the marker data.

10. The locating device of claim 9, further comprising:

communication circuitry for transmitting the stored data record to a computer running a mapping application.

11. A system for locating a position marker, comprising:

a locating device for obtaining the physical location of the position marker but not GPS coordinates associated with the physical location;

a GPS device communicatively coupled to the locating device, the GPS device providing GPS coordinate data associated with the obtained physical location of the position marker when the position marker is located by the locating device;

a computer for running a mapping application; and communication circuitry in at least one of the locating device and the GPS device for transmitting a data record to the computer to update the mapping application, the data record associating the GPS coordinate data with the located position marker.

12. The system of claim 11, wherein the locating device reads marker data from the position marker.

13. The system of claim 12, wherein the data record includes GPS coordinate data provided by the GPS device that is associated with marker data read from the position marker.

14. The system of claim 11, wherein the GPS device and the computer are integrated in the same device.

15. A method of locating a position marker, comprising:

operating a locating device to obtain the physical location of the position marker but not GPS coordinates associated with the physical location;

obtaining GPS coordinate data associated with the obtained physical location of the position marker in the same step as location of the position marker by the locating device; and storing a data record associating the GPS coordinate data with the located position marker.

16. The method of claim 15, further comprising:

operating a computer to run a mapping application; and transmitting the data record to the computer to update the mapping application.

17. The method of claim 15, further comprising:

operating the locating device to read marker data from the position marker.

18. The method of claim 17, wherein storing the data record comprises associating the GPS coordinate data with the marker data read from the position marker.

* * * * *

UNITED STATES PATENT AND TRADEMARK OFFICE
CERTIFICATE OF CORRECTION

PATENT NO. : 7,319,387 B2  Page 1 of 1
APPLICATION NO. : 10/802345
DATED : January 15, 2008
INVENTOR(S) : Corey M. Willson It is certified that error appears in the above-identified patent and that said Letters Patent is hereby corrected as shown below:

Title Page
    After "Item [73] Assignee:", delete "Innovaative" and insert --Innovative--.

Signed and Sealed this

Twenty-ninth Day of April, 2008

JON W. DUDAS
*Director of the United States Patent and Trademark Office*